US012425232B2

(12) United States Patent
Wang et al.

(10) Patent No.: US 12,425,232 B2
(45) Date of Patent: Sep. 23, 2025

(54) CALCULATION METHOD AND DEVICE FOR ELLIPTIC CURVE DIGITAL SIGNATURE TO RESIST MEMORY DISCLOSURE ATTACKS

(71) Applicants: INSTITUTE OF INFORMATION ENGINEERING, CHINESE ACADEMY OF SCIENCES, Beijing (CN); DATA ASSURANCE AND COMMUNICATIONS SECURITY RESEARCH CENTER, CHINESE ACADEMY OF SCIENCES, Beijing (CN)

(72) Inventors: Wei Wang, Beijing (CN); Yuo Fu, Beijing (CN); Jingqiang Lin, Beijing (CN); Li Song, Beijing (CN); Qiongxiao Wang, Beijing (CN)

(73) Assignees: INSTITUTE OF INFORMATION ENGINEERING, CHINESE ACADEMY OF SCIENCES, Beijing (CN); DATA ASSURANCE AND COMMUNICATIONS SECURITY RESEARCH CENTER, CHINESE ACADEMY OF SCIENCES, Beijing (CN)

( * ) Notice: Subject to any disclaimer, the term of this patent is extended or adjusted under 35 U.S.C. 154(b) by 366 days.

(21) Appl. No.: 18/024,851

(22) PCT Filed: Apr. 28, 2022

(86) PCT No.: PCT/CN2022/085702
§ 371 (c)(1),
(2) Date: Mar. 6, 2023

(87) PCT Pub. No.: WO2023/151171
PCT Pub. Date: Aug. 17, 2023

(65) Prior Publication Data
US 2023/0254160 A1    Aug. 10, 2023

(51) Int. Cl.
*H04L 9/32* (2006.01)
*H04L 9/06* (2006.01)
*H04L 9/40* (2022.01)

(52) U.S. Cl.
CPC .......... *H04L 9/3252* (2013.01); *H04L 9/0643* (2013.01); *H04L 63/1466* (2013.01)

(58) Field of Classification Search
CPC . H04L 9/3252; H04L 9/0643; H04L 63/1466; H04L 9/002; H04L 9/3066
See application file for complete search history.

(56) References Cited

U.S. PATENT DOCUMENTS 9,645,794 B2 * 5/2017 Peeters ................. H04L 9/3066
10,038,561 B2 * 7/2018 Li ......................... H04L 9/3066
(Continued)

FOREIGN PATENT DOCUMENTS

CN          104852805 A  *  8/2015

OTHER PUBLICATIONS

"Karl Bernard Leboeuf, GPU and ASIC Acceleration of Elliptic Curve Scalar Point Multiplication, 2012, University of Windsor, p. 24-25" (Year: 2012).*

*Primary Examiner* — Mohammed Waliullah
(74) *Attorney, Agent, or Firm* — Dilworth & Barrese, LLP.; Michael J. Musella, Esq.

(57) ABSTRACT

The invention discloses a calculation method and device for elliptic curve digital signature to resist memory disclosure attacks aiming signing private keys, which belongs to the field of cryptography technology. The method described in the invention includes the following steps. During initialization phase happened in a trusted environment, the key of symmetric cryptographic algorithm is used to encrypt the random number k1 and the private key used for signing, the scalar multiplication k1×G is calculated. At each signing (Continued)

phase, the plaintext data used to calculate s is calculated based on the selected signature algorithm and the value of scalar multiplication k1×G. The plaintext data used to calculate s include r or the data calculated based on r. Inside registers, s is calculated based on the above plaintext data and the ciphertext of random number k1 and the ciphertext of the private key. The signature of the message is (r, s). The invention ensures that operations executed in memory will not expose any information related to the private key and the random number because calculations involve sensitive data are executed inside registers. The invention also reduces performance overhead, improves compatibility and scalability, and has a wide range of application.

8 Claims, 1 Drawing Sheet

(56) References Cited

U.S. PATENT DOCUMENTS

2009/0049299 A1* 2/2009 Jablon .................. H04L 9/3252
 463/40
2021/0028946 A1* 1/2021 Scott ..................... H04L 9/3263

* cited by examiner

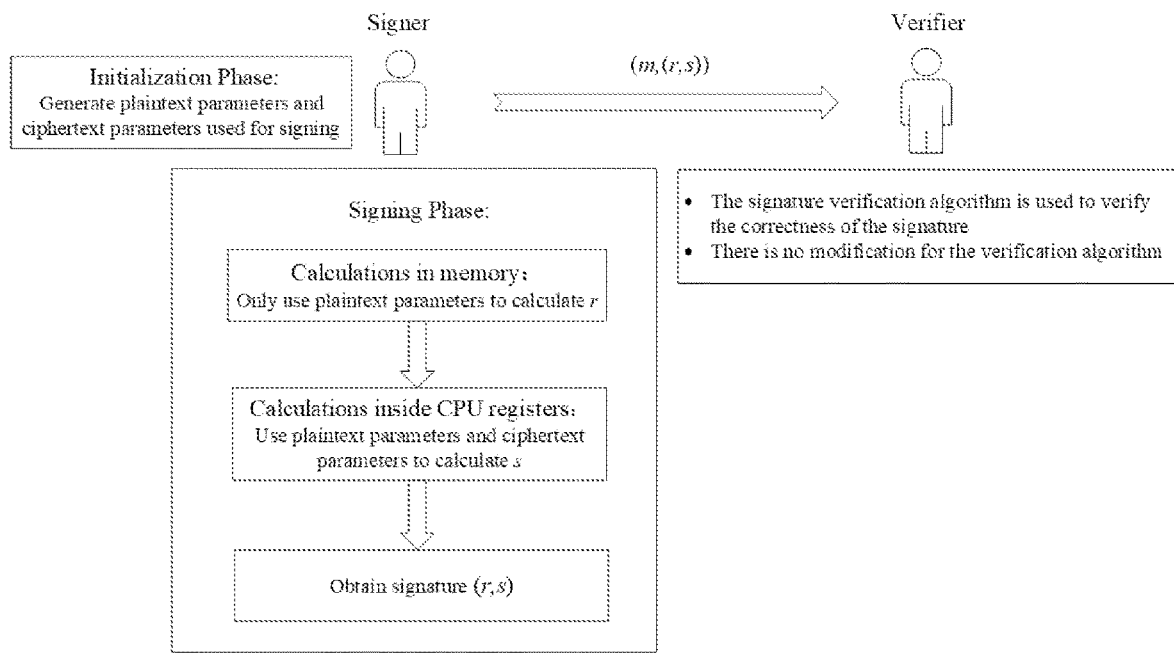

CALCULATION METHOD AND DEVICE FOR ELLIPTIC CURVE DIGITAL SIGNATURE TO RESIST MEMORY DISCLOSURE ATTACKS

TECHNICAL FIELD

The invention belongs to the field of applied cryptography technology, which proposes a calculation method and device for elliptic curve digital signature to resist memory disclosure attacks. The invention protects the cryptographic key in memory to improve the practicability of cryptographic systems.

BACKGROUND ART

Cryptographic software is widely used in various computer and network applications to ensure data security. However, cryptographic software usually does not provide proper protection schemes for cryptographic keys. The disclosure of the key will seriously threaten the security of cryptographic systems. Since the key always appears in memory in the form of plaintext, attackers can easily obtain the key through memory disclosure attacks. Memory disclosure attacks are launched by different ways. Attackers can launch software-based memory disclosure through software vulnerabilities, and can also launch physical memory disclosure such as cold-boot attacks and DMA (Direct Memory Access) attacks by physically accessing the target machine running cryptographic software. Therefore, it is necessary to provide an effective protection scheme for cryptographic keys.

Public key cryptography is an important part of modern cryptography, which effectively solves the problems of key distribution and management, digital signature and authentication. Elliptic curve cryptography (ECC) is a kind of public key cryptography, which has the advantages of shorter key, faster computing and fewer computing resources. One of the purposes of using elliptic curve cryptography is to construct digital signature algorithms ECC digital signature algorithms include SM2 signature algorithm, ECDSA signature algorithm and EC-Schnorr signature algorithm. The signature algorithm relies on the private key to sign the message. Once attackers obtain the private key through memory disclosure attacks, they can forge the signature arbitrarily. Therefore, it is very important to safely implement elliptic curve digital signature algorithms against memory disclosure attacks.

At present, researchers have proposed some protection schemes to resist memory disclosure attacks. Hardware-based protection schemes use Intel SGX (Software Guard eXtensions), MPK (Memory Protection Keys) to protect the cryptographic key. However hardware-based schemes require CPU to support special hardware features. In addition, SGX has side-channel attacks and MPK only resists software-based memory disclosure and can not resist cold boot attacks. Software-based protection schemes use registers inside the processor to implement the whole cryptographic calculations. However, since CPU registers are scarce resources, implementing the whole cryptographic calculations inside registers will cause defects in performance, scalability and compatibility. Besides, implementing the whole cryptographic calculations inside registers needs lots of code refactoring, which significantly improves the difficulty of system development.

SUMMARY OF THE INVENTION

To solve the above problems, the invention provides a calculation method and device for elliptic curve digital signature to resist memory disclosure attacks, which effectively ensures the security of private key. The invention does not rely on any hardware features and does not realize the whole cryptographic calculations inside registers. The invention splits the ECC signature algorithms into two parts, only part implements the simple calculation inside registers and the other part still implements the complex calculation in memory. Moreover, even if attackers obtain all the data in memory, they will not recover the key used for signing. The invention effectively protects the cryptographic key against memory disclosure attacks, and significantly reduces the performance overhead and the difficulty of system development, also improves the compatibility and scalability.

The technical contents of the invention include:

A calculation method for elliptic curve digital signature to resist memory disclosure attacks, the steps include:

Placing the key used for symmetric cryptographic algorithm in the privileged registers during the initialization phase happened in a trusted environment, using the key of symmetric cryptographic algorithm to encrypt the random number k1 and the private key used for signing, wherein the scalar multiplication k1×G is calculated where k1∈[1, n−1] and n is the order of the elliptic curve and G is the base point of the elliptic curve;

Calculating the plaintext data used to calculate s at each signing based on the selected signature algorithm and the value of scalar multiplication k1×G, wherein the plaintext data used to calculate s include r or the data calculated based on r;

Calculating s inside registers based on the above plaintext data and the ciphertext of random number k1 and the ciphertext of the private key;

Using (r, s) as the signature of the message.

Further, the digital signature algorithms include SM2 signature algorithm, ECDSA signature algorithm and EC-Schnorr signature algorithm. The symmetric cryptographic algorithms include AES algorithm and SM4 algorithm.

Further, when the SM2 signature algorithm is selected, the plaintext data used to generate s are calculated by the following steps:

1) Calculating e based on the known parameter $\overline{M}$ of SM2 signature algorithm;
2) Selecting a random number k2 where k2∈[1, n−1];
3) Calculating scalar multiplication k2×G;
4) Adding scalar multiplication k1×G to scalar multiplication k2×G to get the value of k×G where k is the random number;
5) Calculating r based on the value of k×G;
6) Using parameters r and k2 as the plaintext data for generating s.

Further, when the SM2 signature algorithm is selected, s is calculated inside registers by the following steps:

1) Using the key of symmetric cryptographic algorithm to decrypt the ciphertext of the k1 and the private key inside registers to obtain the plaintext k1 and the plaintext private key;
2) Obtaining the random number k inside registers according to k1, k2 and the order of the elliptic curve n;
3) Calculating s inside registers based on the random number k, parameter r, private key and the order of the elliptic curve n.

Further, when the ECDSA signature algorithm is selected, the plaintext data used to generate s are calculated by the following steps:

1) Performing hash function towards message m to obtain z;
2) Selecting a random number k2 where k2∈[1, n−1];

3) Calculating scalar multiplication k2×G;

4) Adding scalar multiplication k1×G to scalar multiplication k2×G to get the value of k×G where k is the random number;

5) Calculating r based on the value of k×G;

6) Using parameters z, r and k2 as the plaintext data for generating s.

Further, when the ECDSA signature algorithm is selected, s is calculated inside registers by the following steps:

1) Using the key of symmetric cryptographic algorithm to decrypt the ciphertext of the k1 and the private key inside registers to obtain the plaintext k1 and the plaintext private key;

2) Obtaining the random number k inside registers according to k1, k2 and the order of the elliptic curve n;

3) Calculating s inside registers based on the parameter z, random number k, parameter r, private key and the order of the elliptic curve n.

Further, when the EC-Schnorr signature algorithm is selected, the plaintext data used to generate s are calculated by the following steps:

1) Performing hash function towards message m to obtain message digest H(m);

2) Selecting a random number k2 where k2∈[1, n−1];

3) Calculating scalar multiplication k2×G;

4) Adding scalar multiplication k1×G to scalar multiplication k2×G to get the value of k×G where k is the random number;

5) Calculating r based on the value of k×G;

6) Calculating H(Q||r||H(m)) based on the message digest H(m), r and the public key Q;

7) Using parameters H(Q||r||H(m)) and k2 as the plaintext data for generating s.

Further, when the EC-Schnorr signature algorithm is selected, s is calculated inside registers by the following steps:

1) Using the key of symmetric cryptographic algorithm to decrypt the ciphertext of the k1 and the private key inside registers to obtain the plaintext k1 and the plaintext private key;

2) Obtaining the random number k inside registers according to k1, k2 and the order of the elliptic curve n;

3) Calculating s inside registers based on the random number k, private key and H(Q||r||H(m)).

Further, the calculation of generating the plaintext data used to generate s is performed in memory.

A storage medium that stores computer programs, wherein the computer program is set to execute any of the above methods.

An electronic device characterized by including the memory in which a computer program is stored and the processor configured to run the computer program to perform any of the methods described above.

The benefits and advantages of the invention are:

1) For the ECC-based digital signature algorithms, the invention uses registers to protect the random number and the private key, which can effectively resist memory disclosure attacks and ensure the cryptographic key security.

2) In order to improve the practicability, the invention does not carry out the whole signing operations inside registers, but proposes a novel idea which splits the signature algorithm into two parts. The part of complex calculation is still implemented in memory while the part of simple calculation is realized inside registers, which significantly saves the register resources, provides better compatibility and scalability, and reduces the difficulty of system development. The invention guarantees that attackers can not recover the private key even if attackers obtain all the memory content through memory disclosure attacks. Besides, the invention only introduces moderate performance overhead while protecting the cryptographic key.

3) The invention has a wide range of application and is applicable to mainstream ECC-based signature algorithms such as SM2, ECDSA and EC-Schnorr.

DESCRIPTION OF DRAWINGS

FIG. 1 illustrates the process for securely generating the digital signature.

DETAILED DESCRIPTION OF THE INVENTION

In order to make the purpose, features and advantages of the invention more clear, the following contents, along with the attached drawings and the content of invention, give further explanations.

The invention provides a novel method to calculate elliptic curve digital signature, which is applicable to mainstream ECC-based signature algorithms such as SM2, ECDSA and EC-Schnorr. The invention can effectively ensure the security of private key during the process of signing through algorithm modification and system design.

The most time-consuming operation during ECC-based signing operations is the scalar multiplication k×G, where k is a scalar and G is a point on the elliptic curve. The scalar multiplication will call EC point doubling and EC point addition for many times. EC point doubling and EC point addition are realized based on finite field operations. Field operations include modular addition, modular multiplication, modular square, reduction and modular inversion. The signature consists of two parts which are r and s. Among them, calculating scalar multiplication only happens once during the process of calculating r. The process of calculating s from r only needs simple operations include modular addition, modular multiplication and perhaps one modular inversion. Therefore, the invention calculates r in memory, which can be easily finished by calling interfaces of existing cryptographic library, and only calculates s inside registers. Since the operations of calculating s from r are both simple operations, they only occupy a small amount of register resources and the signature algorithm can be easily and securely implemented through a small amount of code modification.

For ECC-based digital signature, there are two methods for attackers to obtain the private key. The first method is to obtain the random number k used for signing to infer the private key d and the second method is to directly obtain the private key d in memory. The invention modifies the process of signing to ensure that operations executed in memory will not expose any information related to the private key or the random number. The core idea is to split the random number k into k1 and k2, where k1 and k2 are two independent random numbers. During signing, only k2 is exposed in memory and the plaintext k1 only appears inside registers. Since attackers can not obtain k1 in memory, they can not obtain k. Therefore, attackers can not exploit random number k to recover the private key d. At the same time, the calculation related to the private key d is completed inside registers, attackers can not directly obtain the private key d from memory.

Specifically, the technical solution of the invention is as follows, which is applicable to several ECC-based digital signature algorithms:

Initialization Phase:

1) Generate the AES key and place the AES key inside registers with Ring 0 privilege, such as the debug registers. The AES key can not be obtained because the attacker can not access the privileged registers.

2) Select $k1 \in [1, n-1]$, where n is the order of the elliptic curve. Use AES key to encrypt k1 and the private key d and store them as the form of ciphertext into USB storage or local disk. Because attackers can not obtain the AES key, they can not recover the plaintext of k1 and the private key d. The encrypted k1 and d are input parameters of the protected signing phase.

3) Calculate scalar multiplication $k1 \times G$, where G is the base point of the elliptic curve. The plaintext $k1 \times G$ is input parameter of the protected signing phase. Because of the elliptic curve discrete logarithm problem, attackers can not obtain k1 from $k1 \times G$.

The initialization phase is performed before any ECC signing and can be finished in an offline device, which is considered secure. The initialization phase takes place only once and provides the parameters for a large number of repeated ECC signing.

Signing Phase:

Each signing is divided into two parts, which are unprotected complex calculations in memory and protected simple calculations inside registers.

The unprotected calculations in memory are first carried out. The process of calculating r can be divided into three steps:

1) In memory, choose a random number $k2 \in [1, n-1]$.

2) In memory, calculate $k \times G = (k1+k2) \times G = k1 \times G + k2 \times G$. The actual random number k used for ECC signature algorithms is the result of modular addition of k1 and k2, that is $k=(k1+k2)$ mod n. Since attackers can not obtain k1, they can not recover the random number k even if they successfully obtain k2 through memory disclosure attacks. Operations in Step 2 include one scalar multiplication $k2 \times G$ and one point addition which adds $k2 \times G$ to $k1 \times G$. Since $k1 \times G$ is a known parameter, Step 2 does not need to calculate it. Compared with the original ECC signing, the introduced performance overhead is only once point addition, and the extra performance overhead is negligible.

3) In memory, use $k \times G$ to calculate r.

At this point, the unprotected calculations in memory are completed, which obtain r in memory.

Then, the protected calculations are carried out inside registers. The recovery of the random number k and the calculations related to the private key d are completed inside registers.

4) Copy the plaintext parameters k2 and r from memory to registers.

5) Copy the ciphertext parameters d and k1 to registers. Inside registers, use AES key to decrypt these ciphertext parameters to recover the plaintext d and k1.

6) Inside registers, recover the actual random number $k=(k1+k2)$ mod n.

7) Inside registers, use k, r and d to calculate s, according to the selected signature algorithm such as SM2, ECDSA or EC-Schnorr.

At this point, the protected calculations inside registers are completed, which obtain s inside registers.

The technical scheme illustrates that the plaintext random number k and the plaintext private key d will not appear in memory. Therefore, attackers will not recover the private key even through a successful memory disclosure attack.

As for some ECC-based signature algorithm, if some part of calculations during calculating s from r do not involve sensitive data, they can also be completed in memory. For example, during EC-Schnorr signing, the operations of calculating $z=H(Q\|r\|H(m))$ can be performed in memory after obtaining r because Q and message m are both public-known parameters. Only $s=k+z \times d$ needs to be calculated inside registers.

Using SM2 signature algorithm as an example, the invention describes how the technical scheme can be applied to protect a SM2 signing private key as follows.

Initialization Phase:

1) Generate the SM4 key and place the SM4 key inside registers with Ring 0 privilege, such as the debug registers. The SM4 key can not be obtained because the attacker cannot access the privileged registers.

2) Select $k1 \in [1, n-1]$, where n is the order of the elliptic curve. Use SM4 key to encrypt k1 and the private key d and store them as the form of ciphertext into USB storage or local disk. Because attackers can not obtain the SM4 key, they can not recover the plaintext of k1 and the private key d. The encrypted k1 and d are input parameters of the protected signing phase.

3) Calculate scalar multiplication $k1 \times G$, where G is the base point of the elliptic curve. The message m and the plaintext $k1 \times G$ are input parameters of the protected signing phase. Because of the elliptic curve discrete logarithm problem, attackers can not obtain k1 from $k1 \times G$.

The initialization phase is performed before any ECC signing and can be finished in an offline device, which is considered secure. The initialization phase takes place only once and provides the parameters for a large number of repeated ECC signing.

Signing Phase:

Each SM2 signing is divided into two parts, which are unprotected calculations in memory and protected calculations inside registers.

The unprotected calculations in memory are first carried out:

1) In memory, calculate $e=H(\overline{M})$, where $\overline{M}$ is a known parameter.

2) In memory, generate a random number $k2 \in [1, n-1]$, where n is the order of the elliptic curve.

3) In memory, calculate $(x1, y1)=k \times G=(k1+k2) \times G=k1 \times G+k2 \times G$. The actual random number k used for signing is the result of modular addition of k1 and k2, that is $k=(k1+k2)$ mod n. Since attackers can not obtain k1, they can not recover the random number k even if they successfully obtain k2 through memory disclosure attacks. Operations in Step 3 include one scalar multiplication $k2 \times G$ and one point addition which adds $k2 \times G$ to $k1 \times G$. Since $k1 \times G$ is a known parameter, Step 3 does not need to calculate it. Compared with the original ECC signing, the introduced performance overhead is only once point addition, and the extra performance overhead is negligible.

4) In memory, calculate $r=(e+x1)$ mod n. Go back to Step 2 if $r=0$.

At this point, the unprotected calculations in memory are completed, which obtain r in memory.

Then, the protected calculations are carried out inside registers.

5) Copy the plaintext parameters k2 and r from memory to registers.

6) Copy the ciphertext parameters d and k1 to registers. Inside registers, use SM4 key to decrypt these ciphertext parameters to recover the plaintext d and k1.

7) Inside registers, calculate $k=(k1+k2)$ mod n.

8) Inside registers, calculate $s=(1+d)^{-1} \times (k-r \times d)$ mod n.

At this point, the protected calculations inside registers are completed, which obtain s inside registers.

The technical scheme illustrates that the plaintext random number k and the plaintext private key d will not appear in memory. Therefore, attackers will not recover the private key through a successful memory disclosure attack.

The invention is also suitable for other ECC-based signature algorithms, such as ECDSA and EC-Schnorr. For other protected ECC-based signature algorithms, the initialization phase is kept same with the protected SM2 scheme. They keep the same idea that calculate r in memory and calculate s inside registers which still resists memory disclosure attacks and has small performance overhead.

For the protected ECDSA signing, the initialization phase is kept same with the initialization phase of the protected SM2 scheme. The calculations in memory at each signing consist of three steps. First, calculate z=Hash(m) in memory, which performs hash function towards message m. The result z is the left n bits of Hash(m) where n is the order of the elliptic curve. Second, choose a random number k2∈[1, n−1] in memory and calculate (x, y)=k×G=(k1+k2)×G=k1×G+k2×G in memory where k1×G is known and only k2×G needs to be calculated. Third, calculate r=x mod n in memory. When calculations in memory are completed, z, k2 and r are passed to registers. Ciphertext k1 and d are decrypted into plaintext inside registers. The calculations inside registers at each signing consist of two steps. First, the random number k=(k1+k2) mod n is recovered inside registers. Second, calculate $s=k^{-1}(z+r\times d)$ mod n inside registers.

For the protected EC-Schnorr signing, the initialization phase is kept same with the initialization phase of the protected SM2 scheme. The calculations in memory at each signing consist of two steps. First, choose a random number k2 in memory and calculate r=k×G=(k1+k2)×G=k1×G+k2×G in memory where k1×G is known and only k2×G needs to be calculated. Second, calculate H(Q∥r∥H(m)) in memory where both public key Q and message digest H(m) are public parameters. When calculations in memory are completed, k2 and H(Q∥r∥H(m)) are passed to registers. Ciphertext k1 and d are decrypted into plaintext inside registers. The calculations inside registers at each signing consist of two steps. First, the random number k=(k1+k2) mod n is recovered inside registers. Second, calculate s=k+H(Q∥r∥H(m))×d inside registers.

In summary, the elliptic curve digital signature calculation method of the invention can be applied to sign message m, as shown in FIG. 1. The signing steps include:

1) In the initialization phase, the signer generates plaintext parameters and ciphertext parameters used for signing. The initialization phase takes place only once and can be reused by a large number of repeated ECC signing.

2) During each signing phase, r is calculated first in memory according to plaintext parameters.

3) When the calculations in memory are completed, s is calculated inside registers according to plaintext parameters and ciphertext parameters.

4) Send the signature (m, (r, s)) to the verifier.

5) The verifier uses the signature verification algorithm to judge the correctness of the signature. There is no modification for the signature verification algorithm.

The above examples are only used to illustrate the technical scheme of the invention rather than restrict it. Ordinary technicians in the field may modify or equivalently replace the technical scheme of the invention without deviating from the spirit and scope of the invention. The scope of protection of the invention shall be subject to the claims.

The invention claimed is:

1. A calculation method for elliptic curve digital signature to resist memory disclosure attacks, wherein a digital signature algorithms includes an SM2 signature algorithm, an ECDSA signature algorithm or an EC-Schnorr signature algorithm, the steps include:

Using a key of symmetric cryptographic algorithm to encrypt a random number k1 and a private key used for signing during initialization phase happened in a trusted environment, wherein the symmetric cryptographic algorithms include AES algorithm or SM4 algorithm, a scalar multiplication k1×G is calculated where k1∈ [1, n−1] and n is the order of the elliptic curve and G is the base point of the elliptic curve;

Calculating plaintext data used to calculate s based on the selected signature algorithm and the value of scalar multiplication k1×G at each signing, wherein the plaintext data used to calculate s include r or the data calculated based on r;

Calculating s inside registers based on the above plaintext data and the ciphertext of random number k1 and the ciphertext of the private key;

Using (r, s) as the signature of the message;

wherein when the SM2 signature algorithm is selected, the plaintext data used to generate s are calculated by the following steps:

1) Calculating e based on the known parameter M of SM2 signature algorithm;
2) Selecting a random number k2 where k2 ∈[1, n−1];
3) Calculating scalar multiplication k2×G;
4) Adding scalar multiplication k1×G to scalar multiplication k2×G to get the value of k×G where k is the random number;
5) Calculating r based on the value of k×G;

Using parameters r and k2 as the plaintext data for generating s.

2. The method according to claim 1, wherein when the SM2 signature algorithm is selected, s is calculated inside registers by the following steps:

1) Using the key of symmetric cryptographic algorithm to decrypt the ciphertext of the k1 and the private key inside registers to obtain the plaintext k1 and the plaintext private key;
2) Obtaining the random number k inside registers according to k1, k2 and the order of the elliptic curve n;
3) Calculating s inside registers based on the random number k, parameter r, private key and the order of the elliptic curve n.

3. The method according to claim 1, wherein when the ECDSA signature algorithm is selected, the plaintext data used to generate s are calculated by the following steps:

1) Performing hash function towards message m to obtain z;
2) Selecting a random number k2 where k2∈ [1, n−1];
3) Calculating scalar multiplication k2×G;
4) Adding scalar multiplication k1×G to scalar multiplication k2×G to get the value of k×G where k is the random number;
5) Calculating r based on the value of k×G;
6) Using parameters z, r and k2 as the plaintext data for generating s.

4. The method according to claim 3, wherein when the ECDSA signature algorithm is selected, s is calculated inside registers by the following steps:

1) Using the key of symmetric cryptographic algorithm to decrypt the ciphertext of the k1 and the private key inside registers to obtain the plaintext k1 and the plaintext private key;
2) Obtaining the random number k inside registers according to k1, k2 and the order of the elliptic curve n;
3) Calculating s inside registers based on the parameter z, random number k, parameter r, private key and the order of the elliptic curve n.

5. The method according to claim 1, wherein when the EC-Schnorr signature algorithm is selected, the plaintext data used to generate s are calculated by the following steps:
   1) Performing hash function towards message m to obtain message digest H (m);
   2) Selecting a random number k2 where k2∈ [1, n−1];
   3) Calculating scalar multiplication k2×G;
   4) Adding scalar multiplication k1×G to scalar multiplication k2×G to get the value of k×G where k is the random number;
   5) Calculating r based on the value of k×G;
   6) Calculating H (Q∥r∥H (m)) based on the message digest H (m), r and the public key Q;
   7) Using parameters H (Q∥r∥H (m)) and k2 as the plaintext data for generating s.

6. The method according to claim 5, wherein when the EC-Schnorr signature algorithm is selected, s is calculated inside registers by the following steps:
   1) Using the key of symmetric cryptographic algorithm to decrypt the ciphertext of the k1 and the private key inside registers to obtain the plaintext k1 and the plaintext private key;
   2) Obtaining the random number k inside registers according to k1, k2 and the order of the elliptic curve n;
   3) Calculating s inside registers based on the random number k, private key and H (Q∥r∥H (m)).

7. The method according to claim 1, wherein the calculation of generating the plaintext data used to generate s is performed in memory.

8. An electronic device with memory and processor, wherein the memory stores a computer program and in which a computer program is stored and the processor is configured to run the computer program to perform the method according to claim 1.

* * * * *